INVENTORS
CHARLES W. CHILLSON
ELLARSON R. STOUT
BY  GORDON R. SMITH
WILLIAM J. LEBO

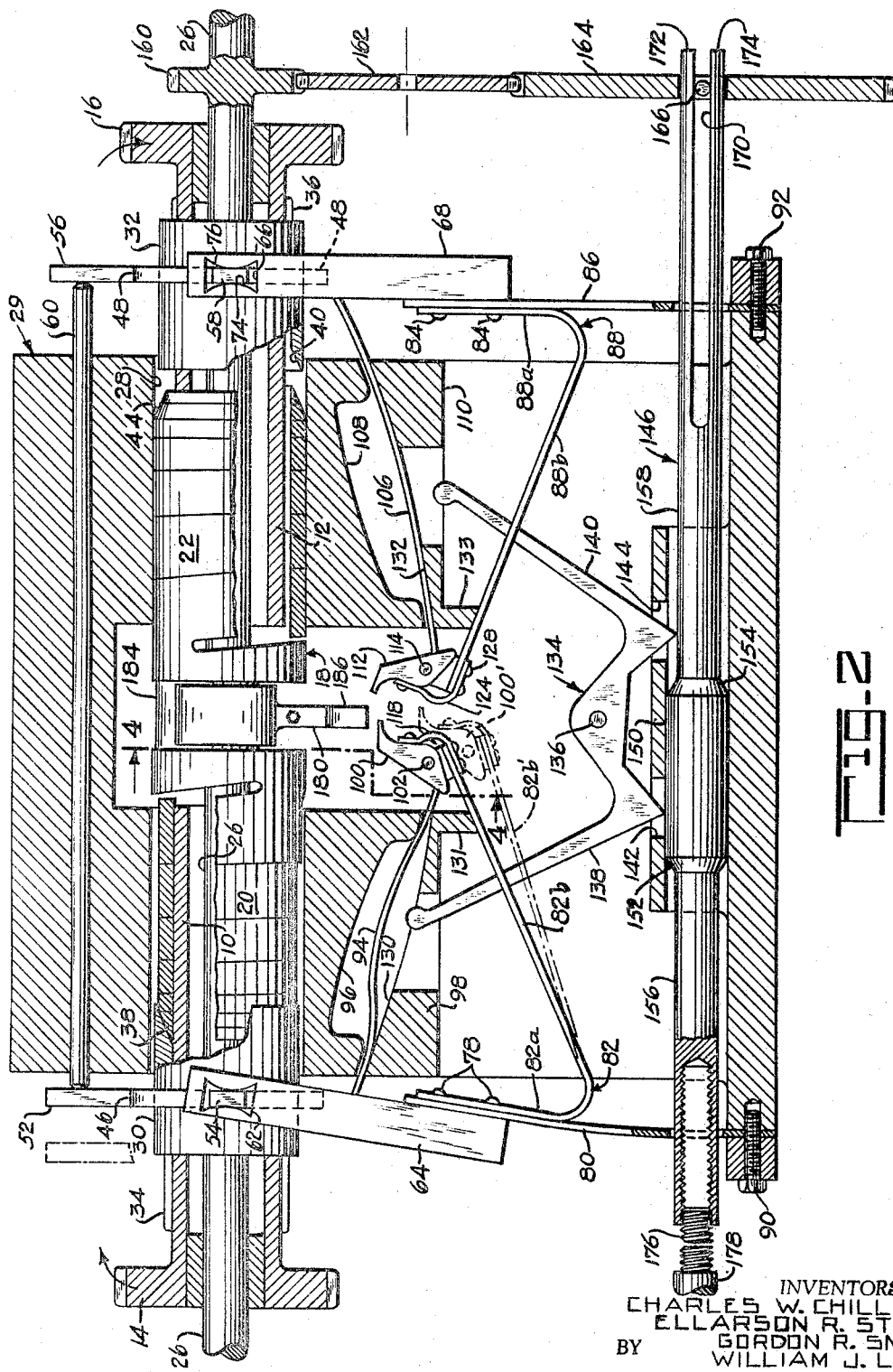
FIG.2
INVENTORS
CHARLES W. CHILLSON
ELLARSON R. STOUT
GORDON R. SMITH
WILLIAM J. LEBO
BY 
THEIR ATTORNEY May 16, 1967  C. W. CHILLSON ET AL  3,319,752
FRICTION CLUTCH WITH SNAP ACTION ACTUATION MEANS
Filed Feb. 17, 1965  3 Sheets-Sheet 3

William V. Ebs
THEIR ATTORNEY

United States Patent Office 3,319,752
Patented May 16, 1967

3,319,752
FRICTION CLUTCH WITH SNAP ACTION ACTUATION MEANS
Charles W. Chillson, Wayne, Ellarson R. Stout, Fayson Lakes, Gordon R. Smith, Sparta, and William J. Lebo, Pequannock, N.J., assignors to Curtiss-Wright Corporation, a corporation of Delaware
Filed Feb. 17, 1965, Ser. No. 433,432
18 Claims. (Cl. 192—51)

My invention relates to friction-type clutches and has as a prime object the provision of an improved all mechanical fast acting clutch which although capable of being actuated with little effort can transmit substantial amounts of power.

It is also an object of the invention to provide for the digital operation of a friction-type clutch having the aforesaid characteristic.

It is still another object of the invention to provide a friction-type clutch having actuating mechanism in which energy is stored during periods of clutch engagement for subsequent release in response to an input signal.

It is yet another object of the invention to provide actuating mechanism as described requiring only a very slight movement of one of the elements thereof to trigger it into operation.

Other objects and advantages of the invention will become apparent hereinafter.

The clutch of the invention incorporates a uniquely constructed actuating mechanism which is related in a novel manner to other components of the device. Such actuating mechanism includes an elongated resilient member which is forced by end loads into tight engagement with the concave surface of fixed structure. The mechanism is thereby conditioned for operation which is initiated when the member is buckled under the end loads by slightly deflecting it at one point away from the concave supporting surface. When the member buckles, the actuating mechanism becomes effective to operate the clutch. Operation of the clutch results in the actuating mechanism being reset to reload the resilient member. When the member has been reloaded the actuating mechanism is again in condition for operation. Preferably, helical clutch springs are utilized in the clutch of the invention as friction elements to engage and disengage clutch surfaces for the purpose of operably connecting and disconnecting input and output shafts, although it is to be realized that other means, as for example conical friction surfaces or friction discs, might also be employed for this purpose.

Referring to the drawings:

FIG. 2 is a view similar to FIG. 1 showing the said clutch in an actuated condition;

Figure 5:
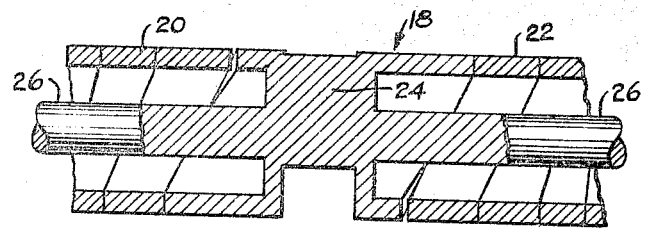
FIG. 5 is a vertical longitudinal sectional view of the output shaft of the clutch.

The clutch includes hollow input shafts 10 and 12 which are provided with gears 14 and 16 respectively for driving the shafts in opposite directions as shown. A double lead tapered helical spring 18 concentric with the input shaft comprises coils 20 which surround the input shaft 10 and coils 22 which surround input shaft 12. Spring 18 connects at 24 (FIG. 5) between the coils 20 and 22 with the clutch output shaft 26. The spring 18 and shaft 26 may be formed, as illustrated, that is, in one piece or they may be formed as separate pieces and connected in any suitable manner.

The coils 20 and 22 are located in bore 28 of the clutch housing 29 and have a diameter such that they tend to engage the inside surface of the bore. However, either one of the coils 20 or 22 can be radially contracted to move it out of contact with the surface of the bore and into engagement with an input shaft. The coils 20 and 22 are similarly wound, as shown, in a manner such that the coils can be radially contracted by movement of the free end of the coils 20 in the direction of rotation of input shaft 10, and the coils 22 radially contracted by movement of the free end of the coils 22 in the direction of rotation of shaft 12. With both of the coils 20 and 22 in engagement with the surface of the bore 28, the input shafts 10 and 12 can rotate independently of the output shaft 26, but the output shaft is prevented from rotating since any rotational movement thereof would tend to tightly wind one or the other of the coils against the bore and so lock the output shaft to the housing 29. With one or the other of the coils 20 or 22 wound down against an input shaft, a driving connection is established between the input shaft engaged by the coils and the output shaft 26.

Members 30 and 32 are provided to actuate the coils 20 and 22 respectively. Member 30 rotates with and is slidable on input shaft 10, whereas member 32 rotates with and is slidable on input shaft 12. Spline connections as shown at 34 and 36 may be provided between the members and input shafts for the purpose of assuring rotation of the members 30 and 32 with input shafts 10 and 12 respectively while permitting axial movement of the members into and out of engagement with spring 18. The members include conically formed surfaces such as shown at 38 and 40 which are engageable with conical ends 42 and 44 respectively of the coils of spring 18.

Figure 3:
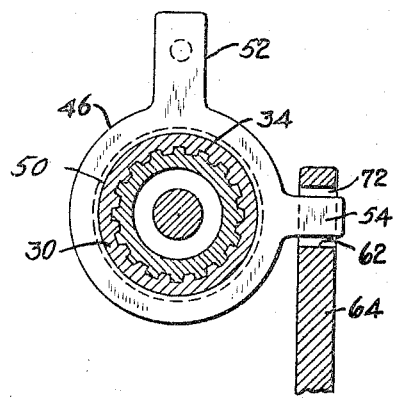
FIG. 3 is a sectional view taken on the plane of the line 3—3 of FIG. 1.

Members 30 and 32 have collars 46 and 48 respectively mounted thereon. Each collar is located in an annular groove, as shown at 50, to prevent relative axial movement of the collar and member but permit rotation of the member under the collar (FIG. 3). Radial extensions 52 and 54 are provided on the collar 46, and like extensions 56 and 58 are provided on collar 48. The extensions 52 and 56 are engageable with a rod 60 which is of a length such as to permit one or the other of the members 30 and 32 to engage the spring 18, but to prevent the members from simultaneously engaging the spring to thereby connect the output shaft 26 to both input shafts at the same time. Extension 54 projects through an opening 62 in link 64 of the clutch actuating mechanism and extension 58 extends through opening 66 in link 68 of the actuating mechanism. The sides of the openings in the links are formed with cam surfaces as at 70 and 72, and at 74 and 76 to permit angular movement of the links.

Link 64 is secured at 78 to resilient elements 80 and 82, and link 68 is secured at 84 to the resilient elements 86 and 88. The elements 80 and 86 are secured to the base 89 of the clutch housing by bolts 90 and 92 as shown. Element 82 includes leg 82a which extends generally in the same direction as link 64, and leg 82b which is integral with leg 82a and extends at an actue angle to it. Element 88 includes leg 88a which extends generally in the same direction as link 68, and leg 88b which is integral with and extends at an acute angle to the leg 88a. A flat spring 94 shown located between housing portions 96 and 98 has one end in contact with the side surface of link 64 and the other end in contact with the lower end of a foot 100 pivotally mounted at 102 on a support 104 at the free end of element 82. A like spring 106 located between housing portions 108 and 110 has one end in engagement with the side surface of link 68 and the other end in engagement with the lower end of a foot 112 pivotally mounted at 114 on a support 116 at the free end of element 88. A spring 118 secured at 120 to the foot 100 and at 122 to element 82 acts in a clockwise direction as viewed in FIGS. 1 and 2 upon foot 100, and a spring 124 secured at 126 to the foot 112 and at 128 to element 88 acts in a counterclockwise direction as viewed in the drawings upon the foot 112.

Figure 1:
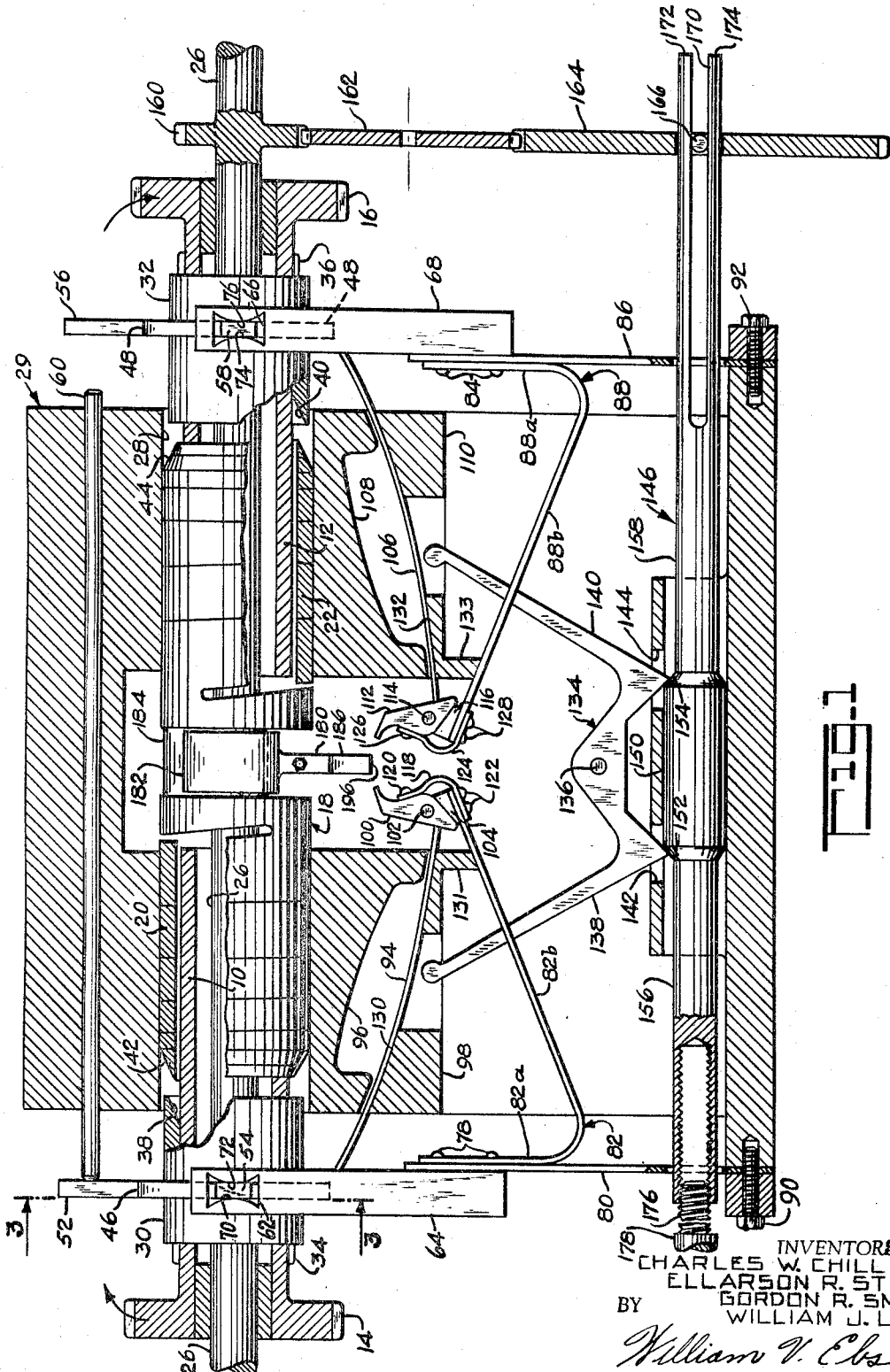
FIG. 1 is a vertcal longitudinal sectional view of the clutch of the invention.

Legs 82a and 82b of element 82 are spread apart in the clutch assembly by spring 94; and the legs acting through the link 64 and foot 100 load the ends of the spring. Similarly legs 88a and 88b are spread apart by spring 106; and the legs 88a and 88b acting through link 68 and foot 112 load spring 106 at its ends. In the absence of an input signal to the clutch, spring 94 is maintained in forced engagement along a substantial portion of its length with concave backing surface 130 on housing portion 98 by the end loads on the said spring 94, and spring 106 is maintained in forced engagement along a substantial portion of its length with concave backing surface 132 on housing portion 110 by the end loads impressed on the column 106 (FIG. 1). The legs 82a and 88a then engage fixed stops 131 and 133 respectively. Springs 94 and 106 should be formed with a slight degree of curvature, preferably less than the degree of curvature of the backing surfaces 130 and 132 respectively prior to their being assembled in the clutch, and when assembled in the clutch should be disposed with the convex side of spring 94 toward concave backing surface 130 and with the convex side of spring 106 toward concave backing surface 132.

A member 134 pivotally mounted in the housing at 136 and including arms 138 and 140 which project into openings 142 and 144 respectively of the housing structure is provided to permit selective deflection of spring 94 and 106. The member 134 is subject to actuation by shaft 146 which is slidably and rotatably mounted within the housing. As shown, the shaft includes an enlarged diameter portion 150, and tapered segments 152 and 154 between the enlarged diameter portion and other portions 156 and 158 of lesser diameter. In a "neutral" position of the shaft 146, shown in FIG. 1, the lower ends of the arms 138 and 140 rest on tapered segments 152 and 154 respectively, and the opposite ends are just barely out of contact with the springs 94 and 106. This is a required position of shaft 146 for maintaining the springs in enforced contact along a substantial portion of the length with their concave backing surfaces, each of the members 30 and 32 out of contact with the spring 18, and the input shafts 10 and 12 disconnected from output shaft 26.

Longitudinal movement of the shaft 146 in one direction or the other causes one of the arms of member 134 to ride up to the larger diameter portion 150 of the shaft and brings the other arm into contact with a lesser diameter portion 156 or 158 to thereby move the member about its pivot at 136 and position the outer end of one arm or the other to slightly deflect one of the springs 94 or 106. Assuming the shaft 146 is moved from "neutral" toward the left as viewed in FIGS. 1 and 2, the outer end of arm 138 is positioned to deflect spring 94, whereupon the end loads on the spring cause it to buckle. The legs 82a and 82b of element 82 tend to close and leg 82a moves toward leg 82b decreasing the angle between the legs (FIG. 2). Leg 82b is prevented from moving toward 82a by engagement with stop 131. As leg 82a moves toward leg 82b, link 64 which is attached to the leg 82a moves with it, and resilient element 80 which is affixed to link 64 and leg 82a is bent away from an unstressed position. Link 64, acting on extension 54 of the collar 46 on member 30, moves member 30 into engagement at the conical surface 38 thereof with the conically formed end 42 of spring coils 20. When the member 30 which rotates with input shaft 10 comes into engagement with the spring end 42, the coils 20 are wrapped away from the bore 28 of housing 29 and into tight frictional engagement with shaft 10 to thereby drivably connect shaft 10 through the coils 20 with the output shaft 26 which is then rotated in the same direction as shaft 10. The coils 22 of spring 18 overrun in the bore 28 while the input shaft 10 drives output shaft 26.

If the shaft 146 is moved to the right rather than to the left from its "neutral" position in which the lower ends of arms 138 and 140 engage the tapered portions 152 and 154 of shaft 146 and the opposite ends of the arms are out of contact with the loaded springs, arm 140 is positioned to deflect spring 106 whereupon the spring 106 buckles and member 32 is caused to engage spring coils 22. The coils 22 are wound away from the bore 28 and onto the surface of input shaft 12 to establish a driving connection between the input shaft 12 and the output shaft 26. Shaft 26 is then driven in the direction of rotation of the input shaft 12 while coils 20 overrun in the bore 28.

Rod 60, which is slidable in housing 29, is positioned by extension 52 on collar 46 and extension 56 on collar 48 so as to avoid any possibility of the spring 18 being simultaneously engaged by the members 30 and 32. As may be seen in FIG. 2, when member 30 is in engagement with spring coils 20, rod 60 is disposed to maintain member 32 out of contact with spring coils 22. When member 32 engages spring coils 22, the rod 60 is disposed to maintain member 30 out of contact with spring coils 20.

A driving connection between input shaft 10 or input shaft 12 and the output shaft 26 established by moving shaft 146 from "neutral" into a new position wherein the lower end of one of the arms of member 134 rests on enlarged diameter portion 150 of shaft 146 and the lower end of the other arm rests on a lesser diameter portion of the shaft persists for a period of time dependent upon the extent to which the shaft was moved from "neutral." The driving connection is disestablished by the operation of a feedback connection from the output shaft 26 to shaft 146, and spring resetting means. The feedback connection includes gear 160 rotatable with the output shaft, an idler gear 162 in engagement with gear 160, and a gear 164 in engagement with idler 162 and connected to shaft 146 by a pin 166 extending across the internal diameter of the gear 164 and through a slot 170 between bifurcated end portions 172 and 174 of shaft 146. The gears 162 and 164 are to be understood as being restrained by suitable means (not shown) from moving axially.

As shown, the shaft 146 is screw connected at 176 to a rod 178 which when moved longitudinally imparts corresponding movement to the shaft to operate the clutch as described. Rod 178 may be taken as the end element of a linkage system for transmitting an input signal to the clutch from a remote location, it being understood that the rod 178 while axially slidable would be rotationally fixed. The screw connection at 176 is provided to impart longitudinal movement to shaft 146 in response to the rotation of output shaft 26 and resulting rotation of shaft 146 by gears 160, 162 and 164 while the rod 178 is held stationary, the threads at the screw connection being of the proper hand to cause the shaft 146 to be returned to "neutral" after having been displaced therefrom.

Figure 4:
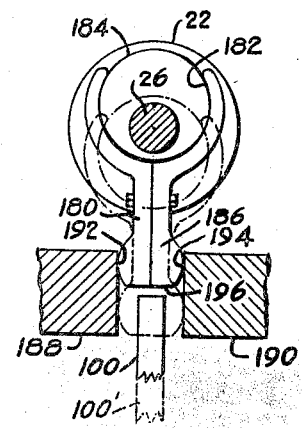
FIG. 4 is a sectional view taken on the plane of the line 4—4 of FIG. 2.

When the shaft 146 has been returned to "neutral" and member 134 has been returned to a corresponding position, the spring 94 or 106 which was buckled to initiate the clutching operation is restored to its enforced position of tight engagement with the adjacent concave backing surface. This is accomplished by means of a plunger 180 mounted as at 182 (FIG. 4) on an eccentric 184 rotatable with the output shaft 26.

The eccentric 184 imparts a reciprocating motion to the plunger 180 as the output shaft 26 rotates and the outer end 186 of the plunger moves vertically between housing portions 188 and 190. As shown, the plunger is formed as at 192 and 194 so that it can rock about the outer end 186 when moved by the eccentric. The plunger 180 acts either upon foot 100 or foot 112 while shaft 26 rotates depending upon which of the springs 94 or 106 was buckled when the clutching operation was initiated. If spring 94 was buckled foot 100 would have been brought under the end surface 196 of the plunger by the action of spring 118, whereas if spring 106 was buckled foot 112 would have been brought under end surface 196 of the plunger by the action of spring 124.

With foot 100 under the plunger, the legs 82a and 82b of element 82 are repeatedly opened by the action of the plunger against the foot, the leg 82b being moved away from stop 131 as to the broken line position of FIG. 2 whenever the plunger moves downwardly. When the plunger moves downwardly foot 100 disengages spring 94 which thereupon assumes its precurved outline, and when the plunger moves upward the foot re-engages the spring tending to restore it to tightly enforced engagement with concave backing surface 130. While shaft 146 is displaced from "neutral" the spring 94 is prevented by the outer end of arm 138 from returning to its position of tight engagement with concave backing surface 130 and can only buckle away from the backing surface. However, upon the return of shaft 146 to "neutral" due to the operation of the feedback connection between output shaft 26 and shaft 146, the spring resets against the backing surface and assumes the loads impressed thereon by the legs 82a and 82b. When spring 94 has been reset, the foot 100 is pivoted, by the reaction force of the spring against the foot, away from its position under plunger 180, and resilient element 80 becomes effective to move element 82 and spring 94 as a unit to bring leg 82b into engagement with stop 131. As element 82 is moved into the position of contact with stop 131, member 30 is moved by resilient member 80, acting through link 64, out of contact with spring coils 20 and the coils expand away from input shaft 10 and into contact with bore 28 whereupon rotation of the output shaft ceases.

With foot 112 under the plunger 180, the legs 88a and 88b of element 88 are repeatedly opened and closed. Leg 88b disengages and re-engages the spring 106, and when the shaft 146 returns to "neutral," the spring 106 resets against backing surface 132. The foot 112 is pivoted out from under plunger 180 and resilient element 86 moves the element 88 along with spring 106 to original positions wherein leg 88b contacts stop 133. Member 32 is separated from the coils 22 and rotation of output shaft 26 ceases.

The clutch is not limited to the type of operation described resulting in continuous rotation of output shaft 26 until the shaft 146 is returned from a displaced position to "neutral" by the operation of the feedback connection between the output shaft 26 and shaft 146. The clutch may also be operated as a digital servo to cause the output shaft 26 to move in discrete steps by jiggling the shaft to move it out of "neutral" and then quickly back into "neutral." Each reciprocating movement of the shaft 146 then, while resulting in member 134 being tilted and one of the springs 94 or 106 being buckled to connect one of the input shafts 10 or 12 to output shaft 26 as explained hereinbefore, produces only one revolution of the shaft 26, since the clutch actuating mechanism is reset during the first cycle of operation of the plunger 180 and the input and output shaft thereupon disconnected.

The clutch of the invention is very sensitive and fast acting, since only a small force need be applied to shaft 146 and the shaft need be moved only a very slight distance to initiate a clutching operation. Spring 94 or 106 buckles when only slightly deflected and rapid movement is enforced upon the spring actuating member 30 or 32 to bring the member into engagement with the spring 18 and thereby quickly establish a connection between the output shaft and one of the input shafts. Helical spring 18 shown surrounding input shafts 10 and 12 is especially effective for quickly establishing a driving connection with the output shaft, and the use of such spring is preferable to the use of friction discs or conical elements for this purpose.

For the most part the energy required to initiate operation of the clutch is that stored in element 82 or 88 by the operation of plunger 180 during a period of clutch engagement. Furthermore, while the output shaft 26 is drivably connected to one of the input shafts, member 30 or 32 is maintained in contact with spring 18 by means of element 82 or 88 respectively with a force sufficient to enable the clutch to transmit the design torque without slipping and no outside force is required. The only signal input required to operate the clutch is that needed to buckle spring 94 or 106 and the input motion required to accomplish this is slight.

In conventional snap action mechansms utilizing flat springs, it is necessary to deflect the spring over center, that is, over an imaginary line between the ends of the spring to buckle the spring and thereby operate the mechanism to close a pair of contacts or perform some other useful function. However, the snap action mechanisms comprising element 82 with spring 94 and element 88 with spring 106 in the clutch of the invention can be operated with a much smaller input motion. It was discovered while working on the clutch of the invention that a snap action response could be obtained with a flat spring or any other elongated resilient member without having to deflect the member over center if the member was loaded at its ends and thereby forced against a concave backing surface, and this principle was applied in the clutch of the invention by loading springs 94 and 106, as described, into enforced contact with surfaces 130 and 132 respectively. It was found that an elongated resilient element which was formed of a suitable material, as for example, one of the carbon or alloy spring steels, Monel, Inconel or Elgiloy, and forced against a concave backing surface having a suitable radius of curvature by end loads on the spring, would buckle when deflected away from the backing surface merely to the extent of about one-twentieth ($\frac{1}{20}$) of the spring thickness. A particularly suitable radius of curvature for the spring backing surfaces 130 and 132 in the clutch of the invention is about 2,000 times the thickness of the spring, although it should be realized that the radius of curvature may be varied considerably as for example, between 1,000 and 5,000 times the thickness of the spring without substantially affecting the magnitude of the deflection required to buckle the spring. The magnitude of the loads impressed on the end of a spring element to force the element against a backing surface does not markedly affect the magnitude of the deflection required to buckle the spring provided the loads are at least slightly greater than that required to seat the spring against the backing surface, and slightly less than that which will cause the spring to buckle independently of any deflection.

While only one embodiment of the invention has been shown and described, it will be apparent to one skilled in the art, that other forms of the invention are possible, and that various changes and modifications may be made in the device illustrated and described without departing from the spirit and scope of the invention.

We claim:

1. Actuating mechanism comprising a rigid support having a concave surface therein, an elongated resilient element, means loading the ends of the element and forcing said element against the support along said concave surface, means operable to locally deflect the element in a direction away from the support and thereby cause the element to buckle under the end loads, and a control member actuable in response to the buckling of said element.

2. Actuating mechanism as defined in claim 1 wherein said element is a flat spring and the radius of curvature of the said concave surface is between 1,000 and 5,000 times the thickness of the spring.

3. Actuating mechanism comprising a rigid support having a concave surface on one side and including an opening which extends from the other side to the concave surface, an elongated resilient element, means loading the ends of said element and forcing the said element against the support along said concave surface, means extending through the opening in said support and operable to locally deflect the element away from the support and thereby cause said element to buckle under the end loads, and a control member actuable in response to the buckling of said element.

4. Actuating mechanism comprising a rigid support having a concave surface, an elongated resilient element, means loading the ends of said element and forcing the said element against the support along said concave surface, means to locally deflect the element in a direction away from the support and thereby cause the element to buckle under the end loads, and a control member connected to the loading means and actuated thereby upon the buckling of said element.

5. Actuating mechanism comprising a rigid support having a concave surface therein, an elongated resilient element, means in contact with and loading the ends of said element to force the element against the support along said concave surface, means operable to locally deflect the said element in a direction away from the support to cause the element to buckle under the end loads and said loading means to partially close upon said element, a control member actuable in response to the buckling of the element, and means operable after the buckling of said element to reset the loading means and cause the element to resume forced engagement with the support along the concave surface.

6. Actuating mechanism comprising a rigid support having a concave surface therein, an elongated resilient precurved element, means in contact with and loading the ends of said element to increase the curvature thereof and force the element against the support along said concave surface, means operable to locally deflect the element a slight amount in a direction away from the support to cause the element to buckle under the end loads and said loading means to partially close upon said element, a control member actuable in response to buckling of the element, and reset means operable upon the loading means after the buckling of said element to first unload the element to allow the element to assume its precurved form and to then condition the loading means to reload the element.

7. Actuating mechanism comprising a rigid support having a concave surface therein, an elongated resilient element, means in contact with and loading the ends of said element to force the element against the support along said concave surface, means operable to locally deflect the said element in a direction away from the support to cause the element to buckle under the end loads and said loading means to partially close upon said element, means operable after the buckling of said element to reset the loading means and cause the element to resume forced engagement with the support along the concave surface, a control member connected with the loading means and movable thereby in one direction upon buckling said element, and means for moving the control member in the other direction after the resetting of the loading means.

8. In combination, an input and an output shaft, means controllable for operatively connecting and disconnecting the input and output shaft, a rigid support having a concave surface therein, an elongated resilient element, means in contact with and loading the ends of said element to force the element against the support along said concave surface, means operable to locally deflect the element in a direction away from the support to cause the element to buckle under the end loads and said loading means to partially close upon said element, a control member movable in one direction in response to the buckling of the said element to actuate the first mentioned means and thereby operably connect the input and output shaft, means operable upon rotation of the output shaft to reset the loading means and cause the element to resume forced engagement with the support along the concave surface, and means for moving the control element in the other direction after the resetting of the loading means to disconnect the input and output shafts.

9. The combination defined in claim 8 wherein the means for resetting the loading means is a cam rotatable with the output shaft.

10. In combination, an input and an output shaft, means controllable for operatively connecting and disconnecting the input and output shaft, a rigid support having a concave surface therein, an elongated resilient element, means in contact with and loading the ends of said element to force the element against the support along said concave surface, a member movable into a position to locally deflect the element in a direction away from the support to thereby cause the element to buckle under the end loads and said loading means to partially close upon said element, a control member movable in one direction in response to buckling of the said element to actuate the first-mentioned means and thereby operably connect the input and output shaft, means operable upon rotation of the output shaft for moving the element deflecting member out of the deflecting position, other means operable upon rotation of the output shaft to reset the loading means and cause the element to resume said forced engagement with the support along the concave surface, and means for moving the control element in a direction other than the said one direction after the resetting of the loading means to disconnect the input and output shafts.

11. In combination, an input shaft, an output shaft concentric with the input shaft, a helical spring concentric with the said shafts and controllable to connect and disconect the shafts, a rigid support having a concave surface therein, an elongated resilient element, means loading the ends of said element and forcing the element against the support along said concave surface, means to locally deflect the element in a direction away from the support and thereby cause the element to buckle under the end loads, and a member operable in response to buckling of said element for controlling said spring.

12. In combination, an input shaft; an output shaft concentric with the input shaft; a helical spring concentric with the said shafts and actuable to connect and disconnect the shafts, said spring being affixed at one end only to one of the shafts; an actuating member engageable with the other end of the spring; a rigid support having a concave surface; an elongated resilient element; means loading the ends of said element and forcing the element against the support along said concave surface; means to locally deflect the element in a direction away from the support and thereby cause the element to buckle under the end loads; and means operable in response to buckling of said element for controlling the said spring actuating member.

13. In combination, a first input shaft to rotate in one direction, a second input shaft to rotate in the opposite direction, an output shaft, first means for connecting and disconnecting the first input shaft and the output shaft, second means for connecting and disconnecting the second input shaft and the output shaft, first snap action actuating means operably connected to the said first means, second snap action actuating means operably connected to the said second means, and a member disposable in one position to trip said first snap action actuating means and thereby cause the said first means to establish an operative connection between the first input shaft and said output shaft, said member being disposable in another position to trip the second snap action actuating means to cause said second means to establish an operative connection between the second input shaft and said output shaft.

14. The combination of claim 13 including means operable by the output shaft for moving said member out of said one position when said first input shaft and the output shaft are connected and for moving the member out of said another position when said second input shaft and the output shaft are connected, and other means actuable by the output shaft for energizing the first snap action actuating means when the first input shaft and output shaft are connected and for energizing the second snap action actuating means when the second input shaft and output shaft are connected.

15. The combination of claim 13 wherein the first means for connecting and disconnecting the first input shaft and the output shaft comprises one set of helical spring coils, the second means for connecting and disconnecting the second input shaft and output shaft comprises another set of helical spring coils in axial alignment with said one set of coils, the sets of coils have the opposing ends connected to the output shaft, and the said other means actuable by the output shaft includes structure connected to the output shaft between said sets of coils.

16. In combination, an input shaft; an output shaft; means controllable to operatively connect and disconnect the input and output shafts; snap action mechanism operably connected to the said controllable means; a member operable to trip the snap action mechanism and thereby cause the controllable means to establish an operative connection between the input and output shafts; and means for resetting the snap action mechanism including a cam operable upon rotation of the output shaft, a pivoted member on the snap action mechanism, and spring means on the snap action mechanism effective when the snap action mechanism is tripped to dispose said pivoted member in a position wherein the cam can engage such member and impart a resetting motion to the snap action mechanism; said snap action mechanism including means effective to maintain the pivoted member in a position permitting the cam to operate without actuating such member until the snap action mechanism is tripped.

17. In combination, a first input shaft to rotate in one direction, a second input shaft to rotate in the opposite direction, an output shaft, first means controllable to operatively connect and disconnect the first input shaft and output shaft, second means for connecting and disconnecting the second input shaft and the output shaft, a first snap action mechanism operably connected to said first means, a second snap action mechanism operably connected to the second means, means to trip the first and second snap action mechanisms to establish an operative connection between the first input shaft and output shaft or between the second input shaft and output shaft, a cam operable upon rotation of the output shaft, a pivoted member on each of the first and second snap action mechanisms, spring means on the first snap action mechanism effective when the first snap action mechanism is tripped to dispose the pivoted member thereon in a position wherein the cam can engage such pivoted member and impart a resetting motion to the first snap action mechanism, and other spring means on the second snap action mechanism effective when the second snap action mechanism is tripped to dispose the pivoted member thereon in a position wherein said cam can engage the pivoted member on said second snap action mechanism and impart a reset motion thereto; each snap action mechanism including means effective to maintain the pivoted member on the snap action mechanism in a position permitting the cam to operate without actuating such member until the snap action mechanism is tripped.

18. The combination as defined in claim 17 wherein the last-mentioned means in each snap action mechanism is an elongated resilient element which acts against the pivoted member thereon in opposition to the spring means on the snap action mechanism to maintain the pivoted member in a position to permit the cam to opertae without actuating such member until the snap action mechanism is tripped to buckle said element and permit the spring means to move the member into a position for actuation by the cam.

References Cited by the Examiner
UNITED STATES PATENTS

| | | | |
|---|---|---|---|
| 2,385,734 | 9/1945 | Silva et al. | 192—51 |
| 2,603,324 | 7/1952 | Pepper. | |
| 3,008,558 | 11/1961 | Bennett et al. | |

FOREIGN PATENTS 878,132   6/1953   Germany.

BENJAMIN W. WYCHE III, *Primary Examiner.*